United States Patent [19]

Saito et al.

[11] Patent Number: 5,963,498

[45] Date of Patent: Oct. 5, 1999

[54] METHOD FOR CONTROLLING MEMORY ADDRESS OF DIGITAL SIGNAL PROCESSOR

[75] Inventors: Tutomu Saito; Masayuki Suda, both of Hamamatsu, Japan

[73] Assignee: Kabushiki Kaisha Kawai Gakki Seisakusho, Japan

[21] Appl. No.: 09/002,309

[22] Filed: Dec. 31, 1997

[30] Foreign Application Priority Data

Jan. 8, 1997 [JP] Japan .................................. 9-011858

[51] Int. Cl.$^6$ ....................................................... G11C 8/00
[52] U.S. Cl. ...................................... 365/230.01; 365/231
[58] Field of Search .............................. 365/230.01, 231, 365/56; 395/827, 400, 375; 370/62

[56] References Cited

U.S. PATENT DOCUMENTS 5,206,940  4/1993  Murakami et al. ..................... 395/400
5,771,394  6/1998  Asghar et al. ........................... 395/827

Primary Examiner—David Nelms
Assistant Examiner—Thong Le
Attorney, Agent, or Firm—Bachman & LaPointe, P.C.

[57] ABSTRACT

Disclosed is a method for controlling a memory address of a digital signal processor in which a memory address is independently managed for each for during parallel processing of a plurality of jobs and no program of the same content as others is stored redundantly. Two bits of a high order A19 and A18 are masked among memory addresses of 20 bits from A0 to A19 which can be accessed for internal and external memories by a digital signal processor. In an address setting and an address computation performed on a program for executing each of jobs of the digital signal processor, only an address space of 18 bits from A0 to A17 can be accessed by an address pointer. The masked two bits of A19 and A18 are accessed by an address area register.

6 Claims, 9 Drawing Sheets

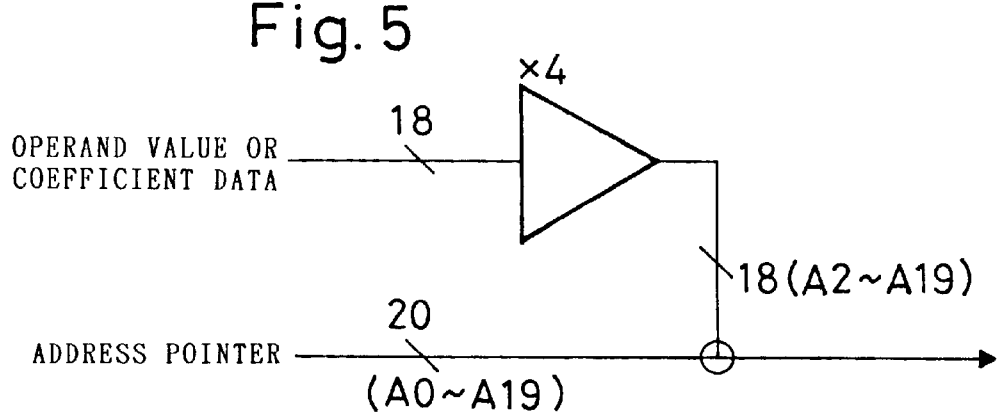
Fig. 5
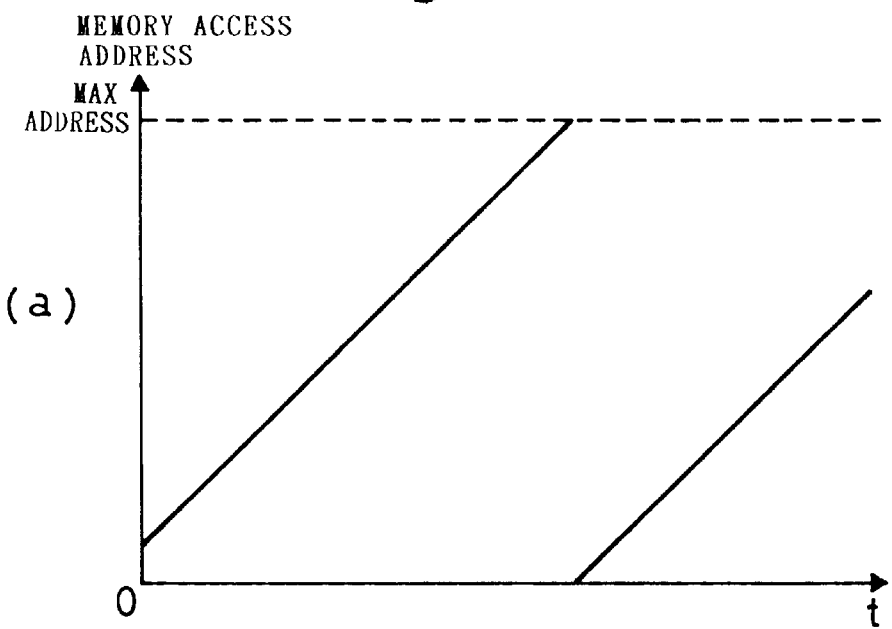
Fig. 6
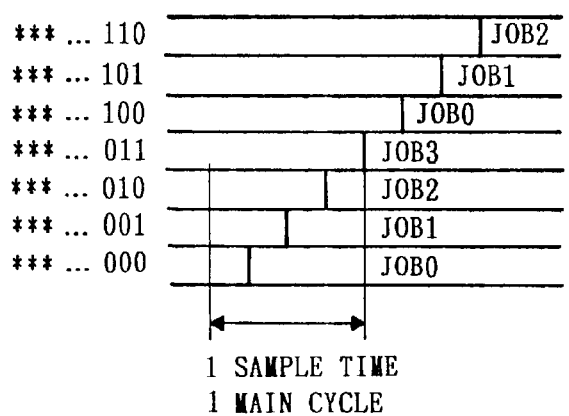

METHOD FOR CONTROLLING MEMORY ADDRESS OF DIGITAL SIGNAL PROCESSOR

BACKGROUND OF THE INVENTION

1. Field of the Invention

The present invention relates to a method for controlling a memory address of an external memory and/or an internal memory of a digital signal processor.

2. Description of the Prior Art

A digital signal processor (hereinafter referred to as a DSP) has an ability to perform a higher accurate processing compared to an analog signal processor. The DSP has features in that it is capable of evenly obtaining arbitrary characteristics by setting parameters such as coefficients and achieving non-adjustment. Moreover, the DSP is capable of processing an analog signal by means of a digitizing method. For this reason, this DSP has been used in a wide field such as a voice signal processing, a communication signal processing, a measurement signal processing, an image signal processing, an earthquake wave signal processing and a underwater acoustic signal processing.

An ordinary DSP is not designed assuming that it processes a plurality of independent programs in a time-shared fashion within a period of time of one sampling time. For this reason, in a case where the plurality of independent programs are processed within one sampling time, used areas of an internal data memory (D-RAM) and an external memory (X-RAM) has been used after dividing them with each program and coefficient. However, when a plurality of jobs are executed in parallel, a disadvantage has been occurred that a memory address is not managed independently for each job, but an access may be done for a memory area of other jobs while one job is being executed.

Moreover, although the jobs executed in parallel are the same, a program must be stored independently in the memory for each job, the program having the same content as those of others so that the quantity of job programs of a host CPU becomes disadvantageously large. For this reason, the types of the jobs which can be stored in the memory are limited.

SUMMARY OF THE INVENTION

The present invention was made in consideration of such problems of the prior arts, and the object of the present invention is to provide a method of controlling a memory address of the DSP which is capable of independently managing a memory address for each job while a plurality of jobs are being executed in parallel, and which is capable of controlling the DSP in order that storing is not redundantly performed for programs of the same content.

The inventors of the present invention inquired into causes of occurrence of the foregoing problems and examined a new constitution which is capable of solving them. As a result of the examination, a devised constitution is the present invention. Details of development of the constitution of the present invention will be described below.

As described above, as the ordinary DSP is not designed assuming that it processes a plurality of independent programs in a time-shared manner within a period of time of one sampling time, the conventional DSP has had to use the internal data memory (D-RAM) and the external memory (X-RAM) after dividing their memory areas with each program and coefficient. For this reason, in order to execute the processing to give an effect to music sounds produced from, for example, a electronic musical instrument, the operations must be performed. Specifically, as shown in FIGS. 8 and 9, when there exists a system in which a chorus effect at a job EFF2 and a delay effect at a job EFF2 are in a time-shared fashion processed with one DSP, respectively, used are a program and a coefficient in which only areas of 0 to 7FFF addresses of the external memory are accessed in the job EFF1, and used are a program and a coefficient in which only areas of 8000 to FFFF addresses of the external memory are accessed in the job EFF2.

This method involves no problems for performing normal computing operations and can performs processings in a time-shared fashion, each processing being fully independent from each other. However, a disadvantage may be produced when any of the programs of the jobs EFF1 and EFF2 is changed during use of them. For example, some of general purpose DSPs can change corresponding coefficients only during an operation of the program. In the case of such DSPs, at a point of time when the program of the job EFF1 stored in the instruction memory (I-RAM) is replaced with new one, old coefficients for the program of the job EFF1 before replacing are left written to a coefficient memory (C-RAM). Then, when the new program of the job EFF1 is operated in this situation, the program of the job EFF1 will be operated using the old coefficients. For this reason, computations are performed with reference to data from unrelated memory address, and further computation results are stored in memory addresses other than the ones set according to the program. Therefore, there is a possibility to access an area for the job EFF2 in disregard of the area of the external memory and the internal memory which have been given for the job EFF1. No problem occurs by closing C1a of FIG. 8, that is, outputting of an input IN1 is continuously output, until a stable operation is obtained for the job EFF1. However, since the job EFF2 continues the stable operation during that period of time, at the time of switching of, for example, the program and coefficients of the job EFF1, when data is written to the external and internal memory areas erroneously, inconvenience occurs at the time when the job EFF2 refers to the external memory. As a result, noises are generated from the output of the job EFF2.

Moreover, in the conventional DSP there has basically been no idea that the external memory is subjected to a partitioning to be used. Therefore, as shown in FIG. 10, all over the space of the external memory is controlled by the address pointer. Specifically, when the address pointer is utilized so as to be incremented by +1 every one sample time (the address pointer is not moved independently for each of the jobs EFF1 and EFF2 but it is incremented by +1 as a shared address pointer), the external memory looks as if it is moved toward 0000 direction from FFFF direction. Finally, the data written during the EFF2 flows into the job EFF1 and the data written in the job EFF1 flows into the EFF2 finally. Since the delay job program writes at FFFF and reads out from 9000 and the chorus job program writes at 7EFF and reads out from 7000, this phenomenon itself poses no problem when each of the EFF programs operate normally. However, as described above, since its own memory area can not be accessed during rewriting one program when it is rewritten, that is, about 200 ms during loading of a new program, as shown in FIG. 10 the content which has been written in one effect program will enter the memory area of other effect program. At this time, in the case where a simple effect program is used and a signal to which the effect is added is output by simply making either C1a and C1b or C2a and C2b in FIG. 8 cross-fade, large noises will be output unexpectedly. Particularly, in the case where a signal with large volume is written to the external memory of the other effect program memory, the signal will enter the memory area of the switched effect program and will be remarkable. Moreover, in the case where other effect is not so large volume on its signal, when an input signal IN1 or IN2 of the switched effect program is 0, sounds which is not expected to be output is undesirably output so that they are perceived.

Moreover, there is another problem. As shown in FIG. 12 in the DSP program chart the jobs of EFF1 and EFF2 can be possible arbitrarily among a plurality of effects. Then, in general, the program in that portion is newly transferred form the host CPU for each time when the effect is selected. Even when the effect of the same content is selected in the jobs EFF1 and EFF2, separate job programs must be transferred. Specifically, it has been required for the host CPU to separately store the effect program and coefficient for the job EFF1 and those for the job EFF2. This is because although an access area in the external memory for the job EFF1 is different from that for the job EFF2, no register capable of solving that problem and sharing the program and the coefficients existed.

Since the above described causes were clarified, an investigation for a constitution capable of solving these problems was performed. As a result of the investigation, the following constitution of the present invention was invented by the inventors. Specifically, the constitution of the present invention, a method for controlling a memory address of a digital signal processor in which an external and/or internal memory having an address space of M bits is provided, is characterized in that when jobs not more than $2^N$ are executed in a time-shared fashion, in address settings and address computations on programs for executing the jobs, an address space of (M–N) bits can be only accessed and an address space of N bits left in the M bits is set to a different value in each of the jobs.

Another constitution of the present invention, a method for controlling a memory address of a digital signal processor in which an external and/or internal memory having an address space of M bits is provided, is characterized in that when jobs not more than $2^N$ are executed in a time-shared fashion, in address settings and address computations on programs for executing the jobs, in address settings and address computations on programs for executing the jobs, an address space of (M–N) bits can be only accessed and an address pointer in common to each job is incremented for the remaining N bits among the foregoing M bits.

In both constitutions, when setting of the value corresponding to the foregoing N bits from the outside of the DSP is made possible, the memory management can be freely performed in spite of an increase in the number of the jobs to be in parallel processed. Moreover, in the first constitution, the foregoing N bits are effectively subjected to a memory allocation in the most significant bit side of the M bits, and, in the second constitution, the foregoing N bits are effectively subjected to the memory allocation in the least significant bit side of the M bits.

In both constitutions the memory address is partially masked. In the first constitution, the memory addresses equal to the masked amount can be set as N dependent area registers, whereby a different memory area for each job can be allocated. In the second constitution, an address pointer common to each of the jobs is incremented, whereby a memory area of each job can be allocated for each increment.

According to the present invention, in the first constitution of the present invention of the method for controlling the memory address of the digital signal processor (DSP), the memory addresses is partially masked, whereby it is possible to allocate the masked portion as the independent N area registers and to allocate the different memory area for each of the jobs.

Moreover, in the second constitution of the present invention of the method for controlling the memory address of the digital signal processor (DSP), the masked portion can be allocated to the memory area of each of the jobs by incrementing the address pointer shared by each of the jobs.

Therefore, both of the constitution of the present invention are capable of independently managing the memory address for each of the jobs, during parallel processing of the plurality of jobs. Even though the plurality of jobs in parallel processed include the same content, one memory area is not accessed by other program.

BRIEF DESCRIPTION OF THE DRAWINGS

For a more complete understanding of the present invention and the advantages thereof, reference is now made to the following description taken in conjunction with the accompanying drawing, in which;

FIG. 5 is an outline showing a circuit constitution for executing a method of controlling a memory address of a DSP of a second embodiment;

FIG. 6 is an explanatory view showing a constitution for allocating a memory area of the DSP in FIG. 5;

DESCRIPTION OF THE PREFERRED EMBODIMENT

Figure 1:
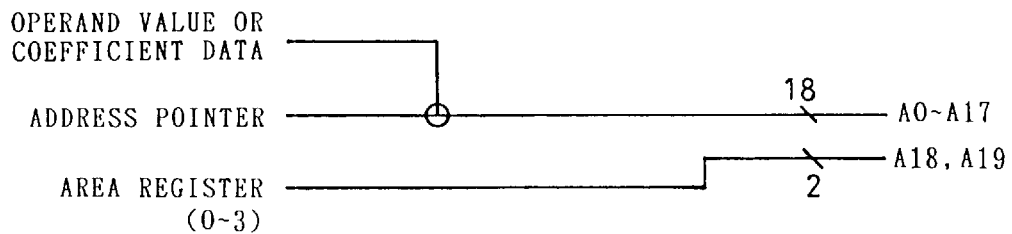
FIG. 1 is an outline showing a circuit constitution for executing a method of controlling a memory address of a DSP of a first embodiment.
Figure 2:
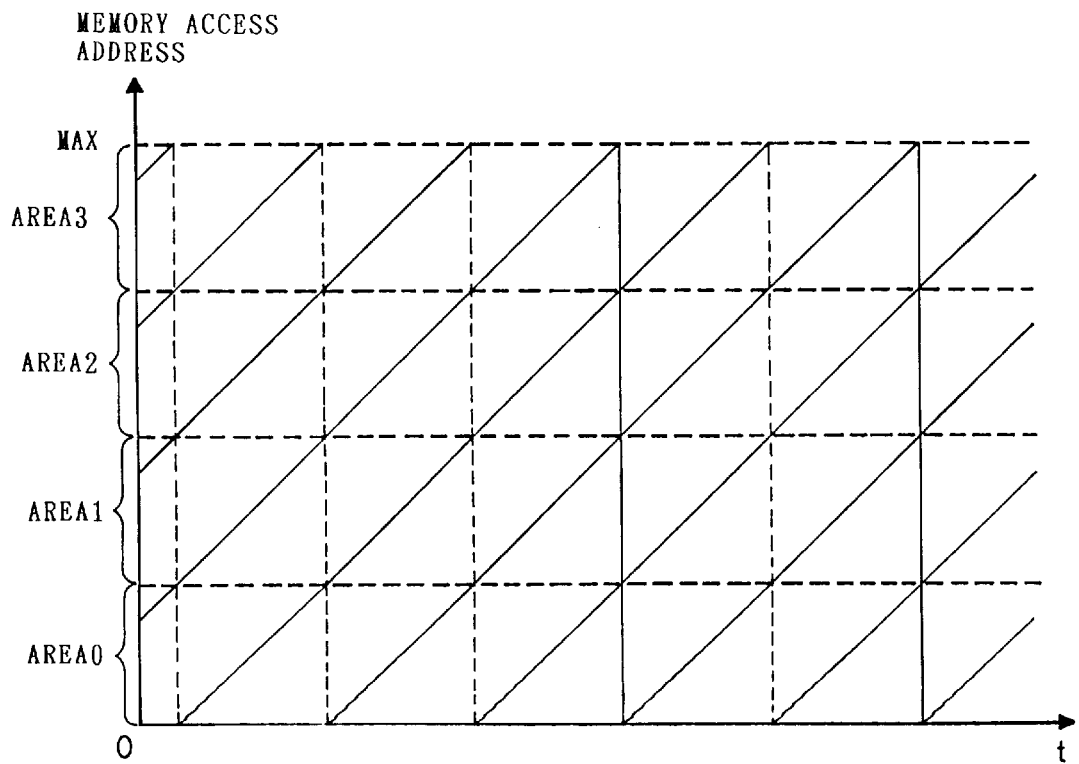
FIG. 2 is an explanatory view showing a constitution for allocating a memory area of the DSP in FIG. 1.
Figure 3:
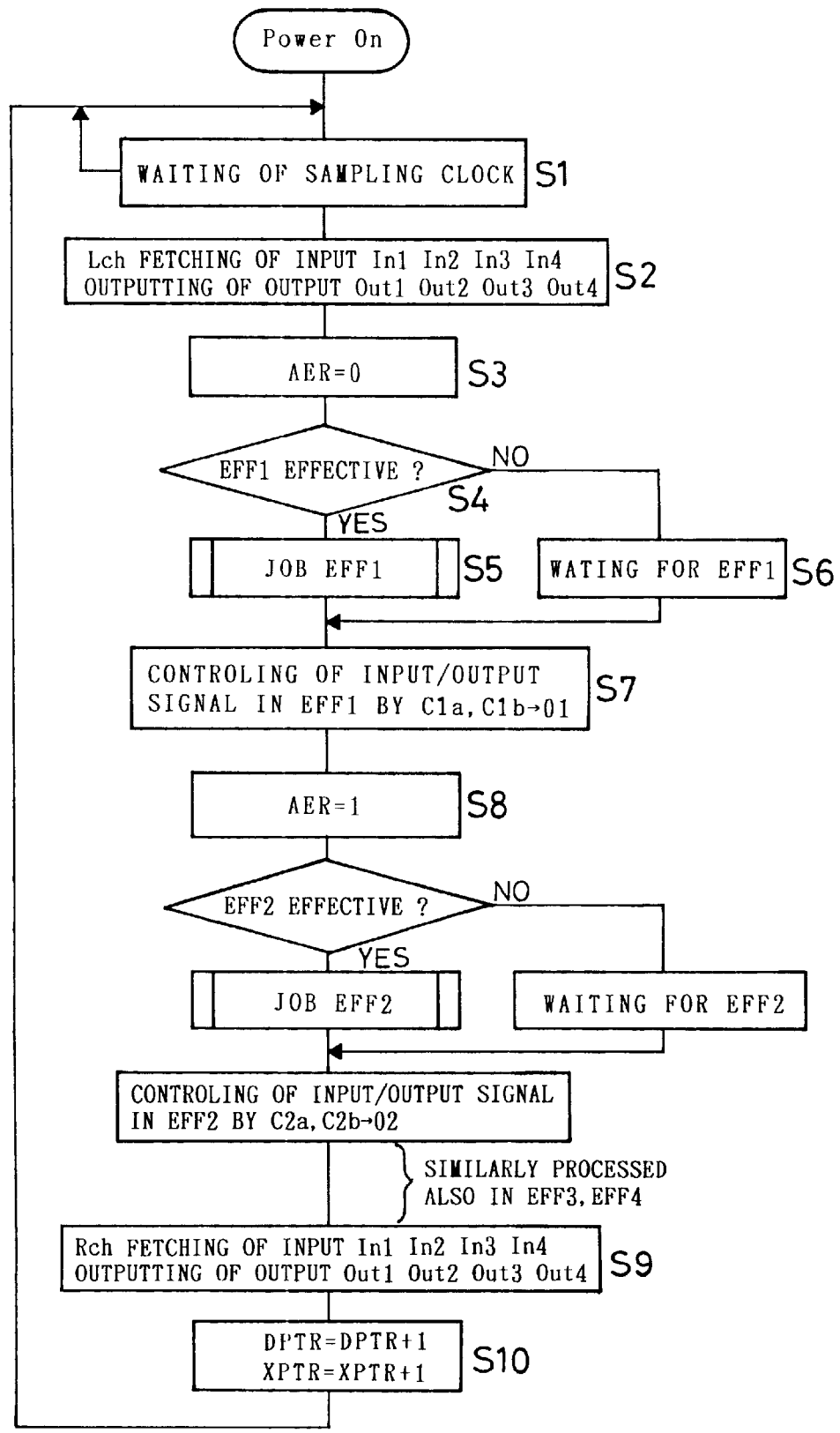
FIG. 3 is a flow chart showing processing procedures of a program when the circuit diagram of FIG. 1 is employed as a constitution of a DSP for adding an effect to music sounds produced from an electronic music instrument.

Preferred Embodiments of the present invention will be described with reference to the accompanying drawings below. FIGS. 1 to 3 show a memory address control device of a DSP for executing a method of controlling a memory address of the DSP of the first embodiment. In the constitution shown in FIGS. 1 to 3, in the portion of the constitution for performing an address control for internal and external memories of the DSP, two bits of high orders A19 and A18 are masked among memory access addresses of 20 bits from A0 to A19. In address setting and address computation performed on a program which executes each job of the DSP, only an address space of 18 bits from A0 to A17 can be accessed by an address pointer. The two bits of A19 and A18 masked can be accessed by an address area register.

In the above-described constitution, the memory area for the 4 jobs at maximum can be secured. Specifically, since it is possible to output a two-bit signal in the address area register, the $2^2$ (four) memory areas can be secured. Thus, as shown in FIG. 2, all of the memory access addresses are divided into four areas of area 0 to area 3. In each area, an operand value or a coefficient data can be written to the memory address designated by an address pointer.

The foregoing constitution was adopted as a constitution of the DSP applying an effect such as a chorus effect and a delay effect to music sounds produced from an electronic music instrument. In the system having the constitution in which these effects are processed as jobs EFF1 to EFF4 in a time-shared fashion with one DSP, the processings are performed according to the flow shown in FIG. 3.

When a power is turned on, a sampling clock waiting state (S1) is brought about. A signal Lch input for the left channel is obtained by fetching the signals given to IN1, IN2, IN3 and IN4 in FIG. 4 into the registers I1, I2, I3 and I4 as In1, In2, In3 and In4. A signal Lch outputting for the left channel are performed by outputting the signal data of Out1, Out2, Out3 and Out4 from temporary registers O1, O2, O3 and O4 to OUT1, OUT2, OUT3 and OUT4 in FIG. 4 (S2).

Next, the foregoing area 0 is designated by an address area register (S3). Then, it is decided whether the job EFF1 is effective or not, and it is checked whether the signal is to be processed by passing through the flow of the effect program for the job EFF1, that is, the processing for adding the effect is to be performed or whether the signal is allowed to bypass for dealing beforehand because of the change of the acoustic effect (S4). The checking is performed for the following reasons. When the change was carried out for the acoustic effect, a previous processing such as partial reloading for the instruction memory and clearing of the coefficient RAM and the data RAM is performed. Therefore, when the processing of the normal effect program is executed ordinarily, there is a fear that this processing may be executed in a run-away state or large noises may be created. Information of the effectiveness of this job may be informed by changing of the value of a certain address of the coefficient RAM by the master CPU, or it is performed by directly sending a signal to the general purpose input port (not shown) from the master CPU.

When the job EFF1 is in an effectively normal state, the effective program (for example, the chorus effect) is called (S5). The call of this effective program is selected among a plurality of acoustic effect additional routines stored in a storing area of the instruction memory (I-RAM) by a program counter. The acoustic effect programs to be selected in total must be contained in a predetermined storing area of the foregoing instruction memory. After processing of the acoustic effect additional routine its signal data is multiplied with the coefficient C1a, and the input In1 stored in the foregoing resister I1 is multiplied with the coefficient C1b. Then, both of the values of the multiplication results are added and the addition result is stored in the temporary register O1. At this time, by controlling the values of the foregoing coefficients C1a and C1b, the signal to which the acoustic effect is added and the signal to which no acoustic effect is added are allowed to be cross-faded (S7).

When the job EFF1 is invalid, before the signal is bypassed through the acoustic effect program, a waiting time is given by the step number equivalent to the job EFF1 (S6). Here, using the loop instruction provided, for example, in the DSP, looping is performed by the step numbers required, that is, the step number of the job EFF1 written to the coefficient RAM is loaded, and it is delayed by the number. This loop is required for the following reasons. In the DSP used here, redundancy functions are abbreviated, and the input and output of R signal and L signal must be performed at the same port with a predetermined period of time which corresponds to a processing time of serial data R0 and L0 from a rising-up or a falling-down of the WS signal. Then, as described above, the cross-faded processing is executed between the sound signal which has been subjected to the acoustic effect additional processing and the acoustic signal which has subjected to no acoustic effect additional processing. Moreover, the cross-faded additional processing is executed between this acoustic signal and the acoustic signal to which the effect acoustic effect is newly added, thereby completing the changing processing of the acoustic effect.

Next, the foregoing area 1 is designated by the address area register (S8). Thereafter, processings similar to the foregoing ones are repeated for the job EFF2, and, further, the similar processings are performed for the jobs EFF3 and EFF4 after the designations of the area 2 and 3.

Figure 4:
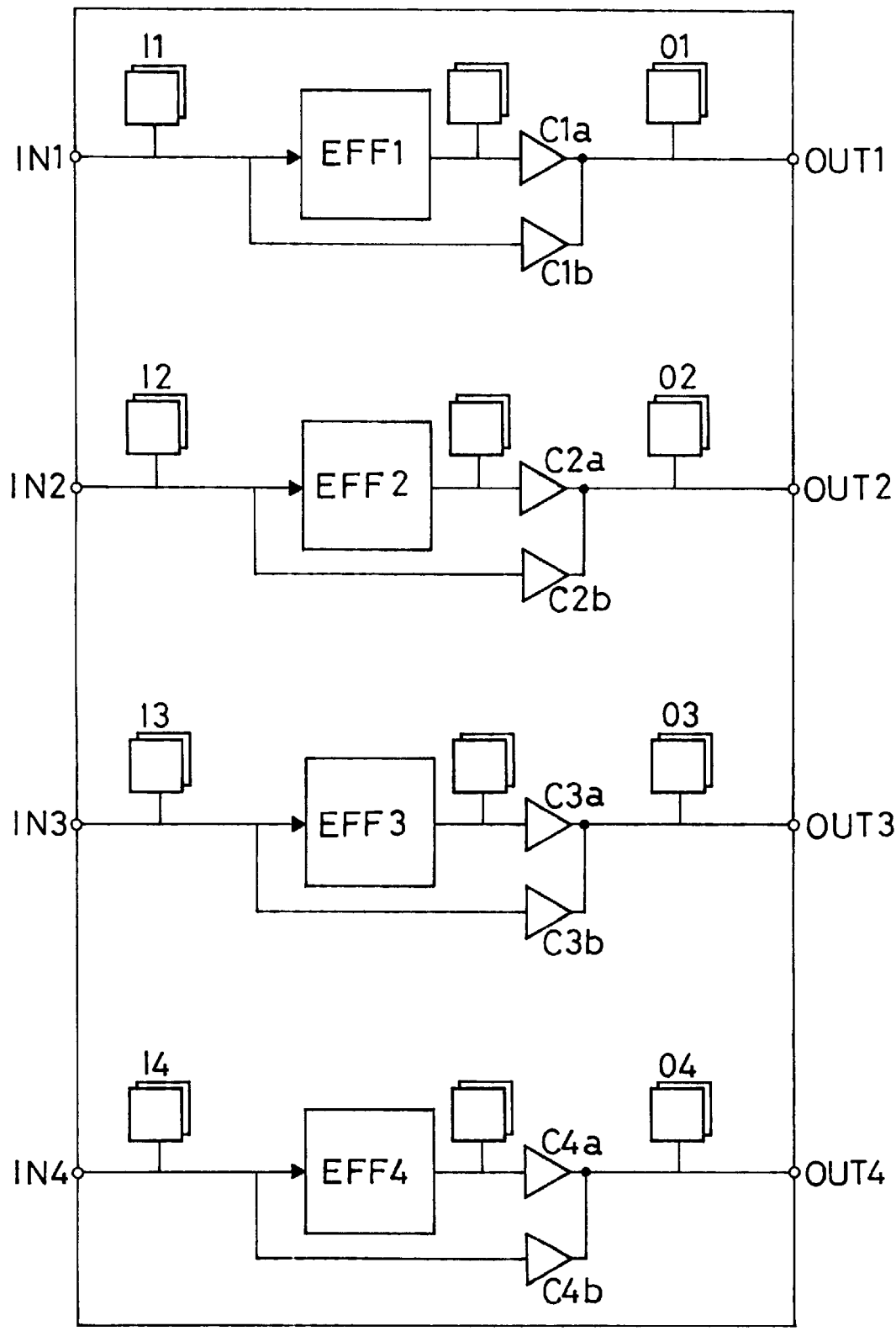
FIG. 4 is an explanatory view showing a signal flow of a main routine in the foregoing DSP.

The signal Rch input for the right channel is obtained by fetching the signals given to IN1, IN2, IN3 and IN4 in FIG. 4 into the registers I1, I2, I3 and I4 as In1, In2, In3 and In4. The signal Rch outputting for the right channel are performed by outputting the signal data of Out1, Out2, Out3 and Out4 from temporary registers O1, O2, O3 and O4 to OUT1, OUT2, OUT3 and OUT4 in FIG. 4 (S9).

Finally, incremented (+1) are the value of the pointer (DPTR) of the internal memory (D-RAM) and the value of the pointer (XPTR) of the external memory RAM (X-DRAM), thereby the flow returns to the starting point (S10). This is because in the program based on the next sampling the address incremented by +1 is automatically accessed, in spite that the same data RAM address is designated.

In the foregoing constitution, it is possible to set the masked two bits as the four independent area registers ($2^2$=4), and the memory areas 0 to 3 can be allocated to each of the jobs EFF1 to EFF4. Therefore, when one job is being executed, accesses to the memory areas of other jobs never occur. Even though the jobs in parallel processed have the same program content, an access to one memory area by the programs of the other jobs is prevented.

Figure 7:
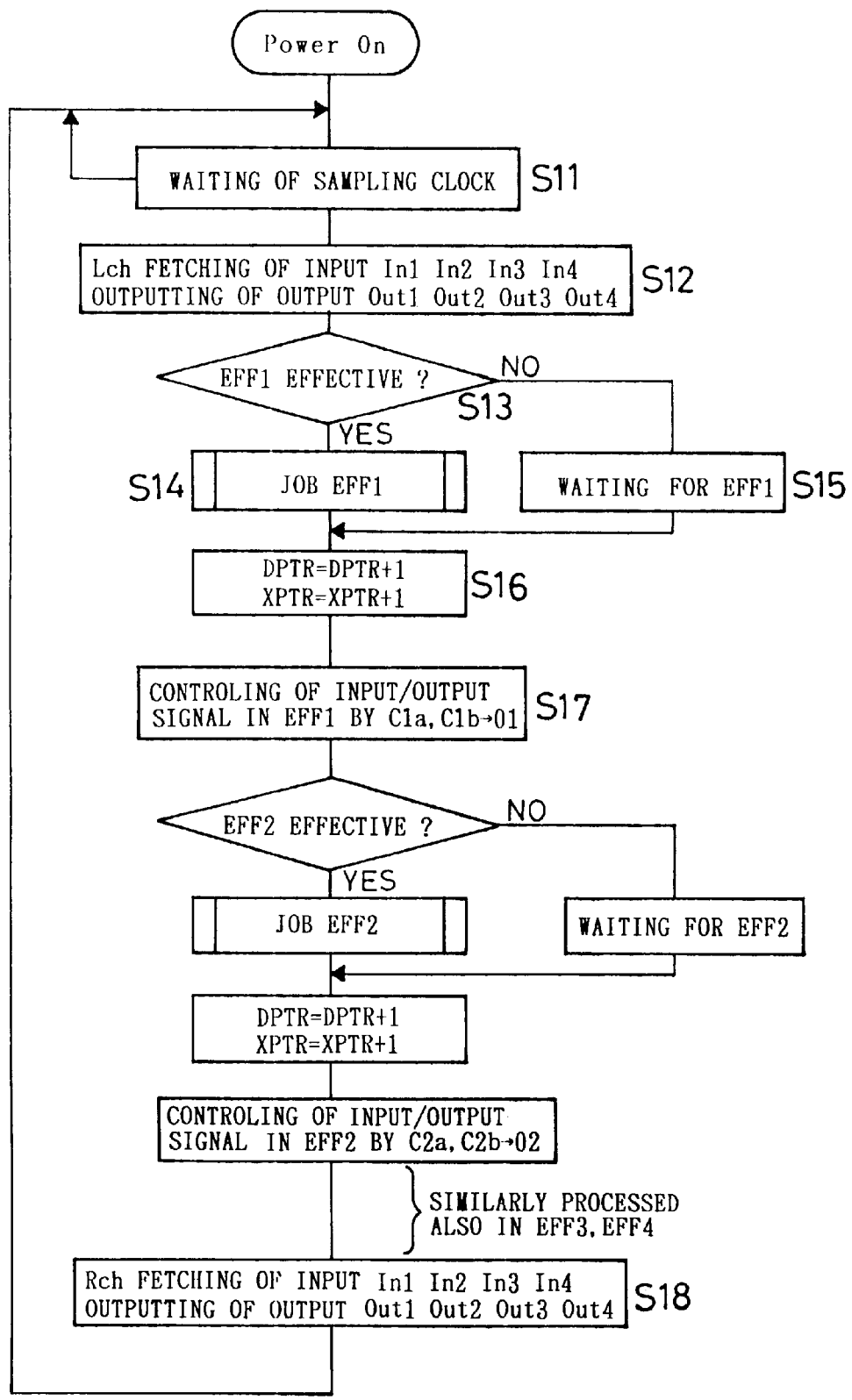
FIG. 7 is a flow chart showing processing procedures of a program when the circuit diagram of FIG. 5 is employed as a constitution of a DSP for adding an effect to music sounds produced from an electronic music instrument.
Figure 8:
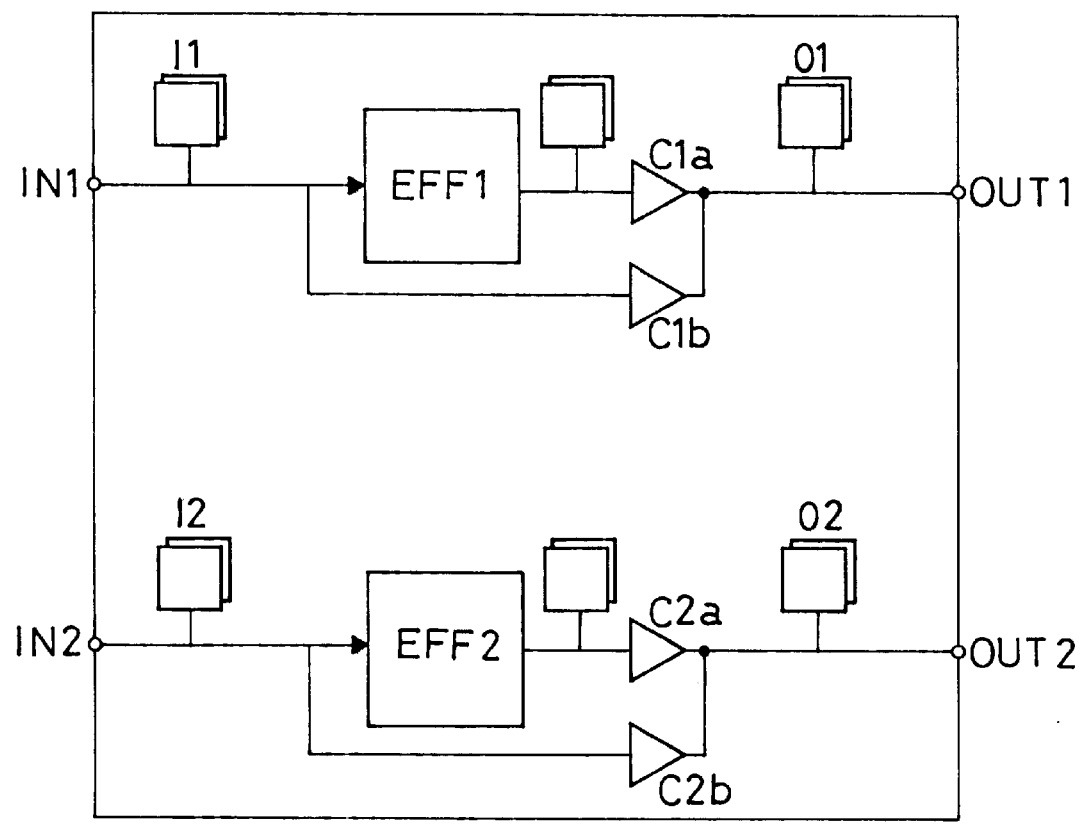
FIG. 8 is an explanatory view showing a signal flow of a main routine in a conventional DSP.
Figure 9:
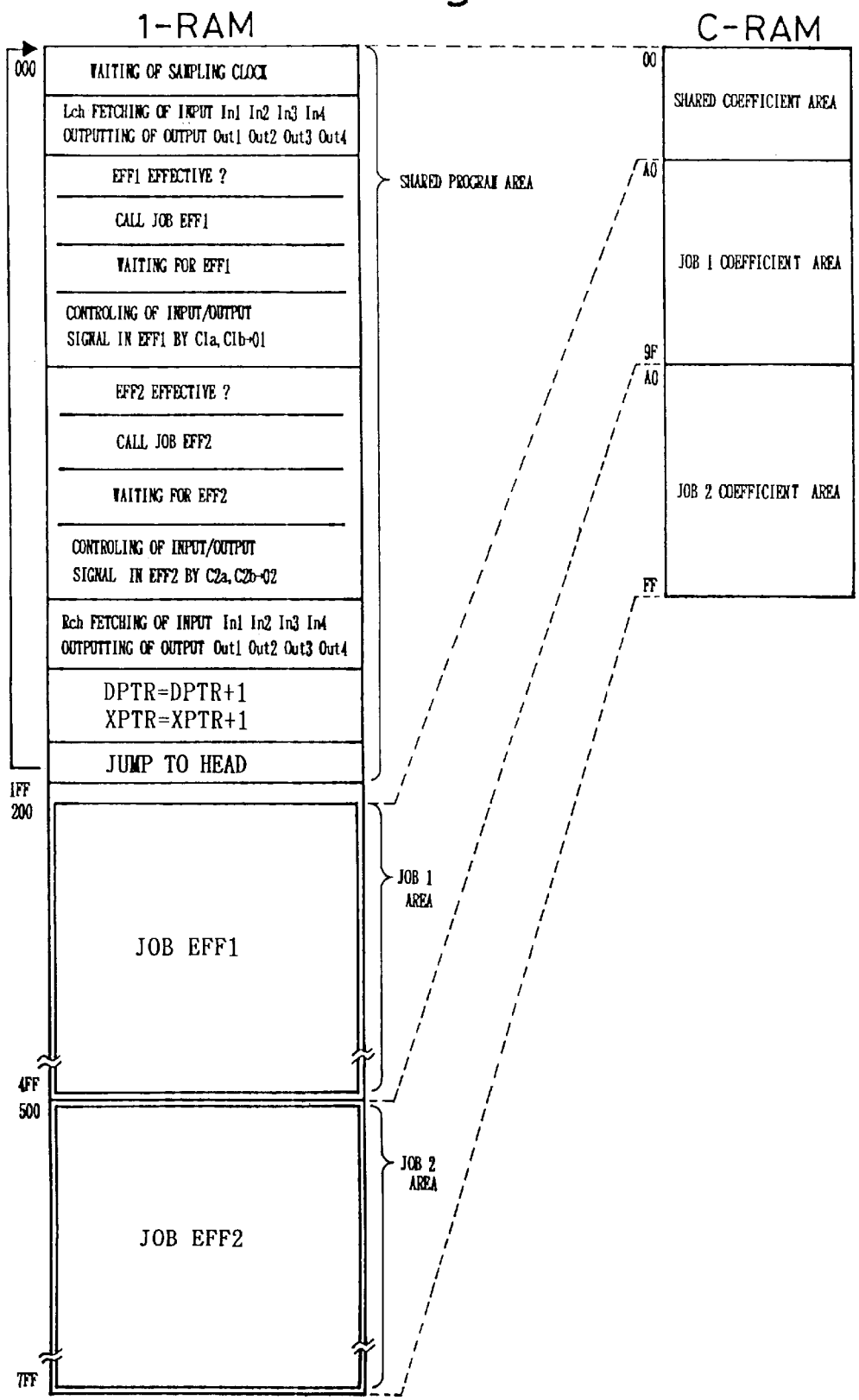
FIG. 9 is an explanatory view showing a memory map of an I-RAM and a C-RAM of the DSP.
Figure 10:
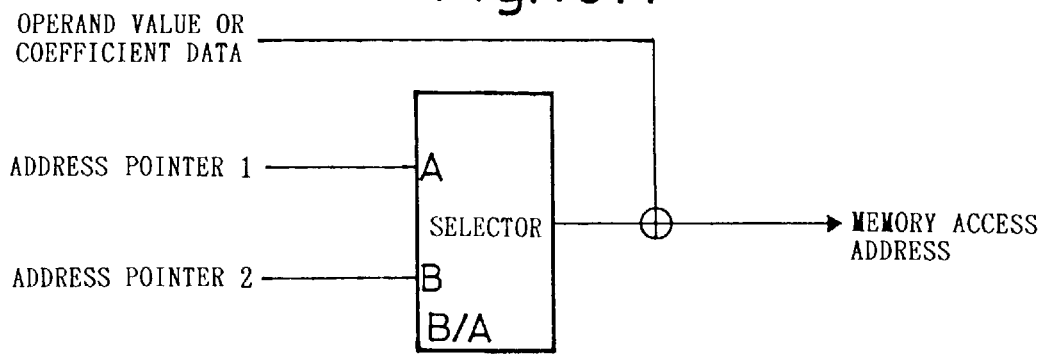
FIG. 10 is an explanatory view showing an address control circuit diagram and an allocation constitution in the conventional DSP.
Figure 10:
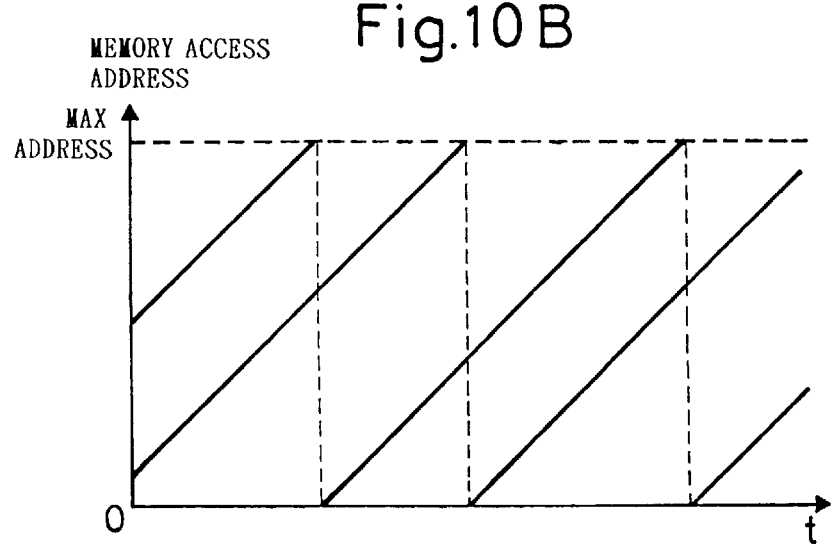
Figure 11:
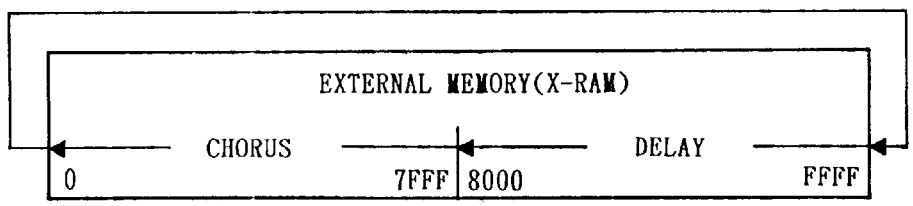
FIG. 11 is an explanatory view showing a visual flow of data on an external memory according to the conventional DSP constitution.
Figure 12:
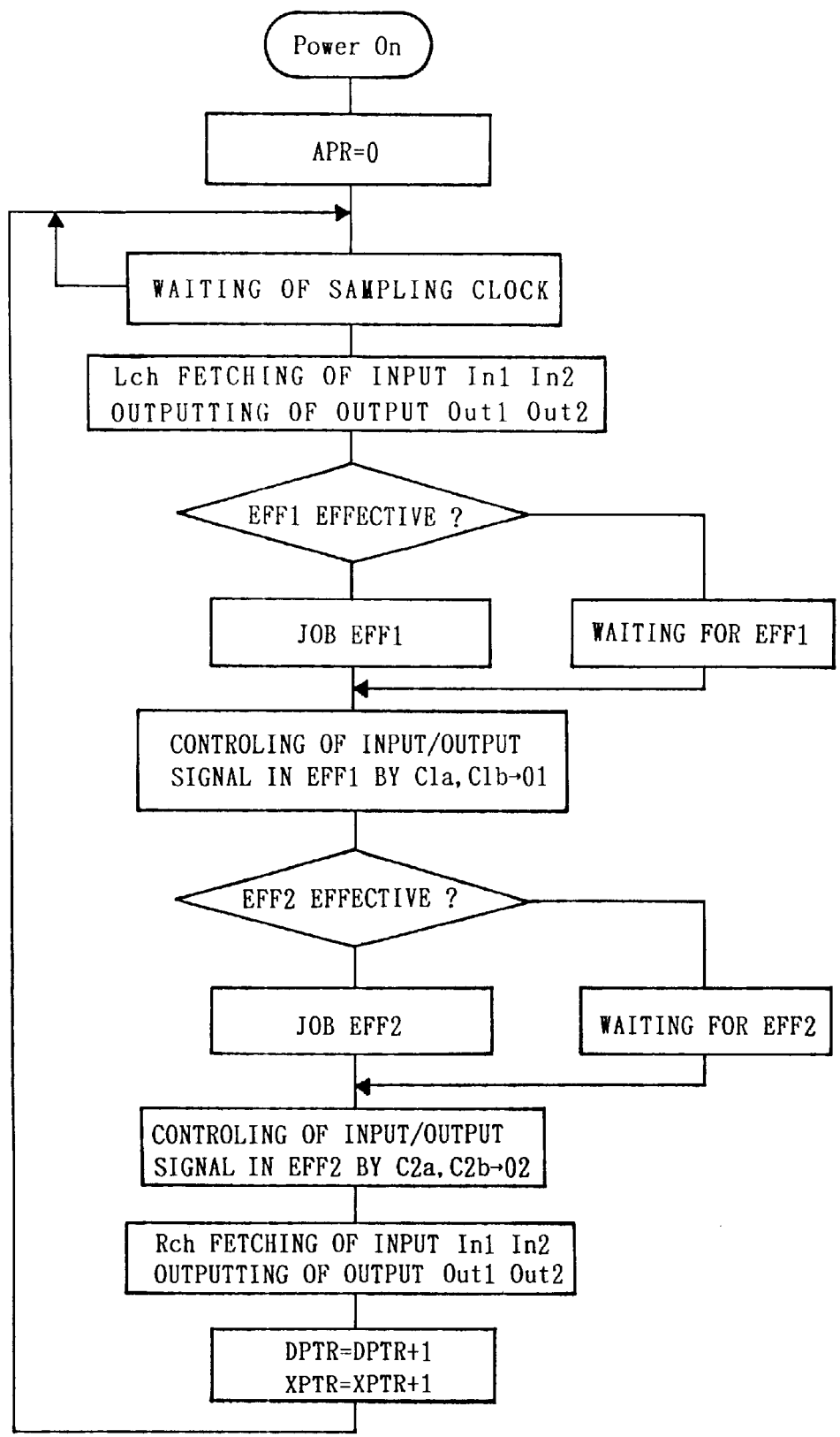
FIG. 12 is a program flow chart in the conventional DSP.

FIGS. 5 to 7 shows a constitution of a second embodiment of a memory address control device of a DSP for performing a method of controlling a memory address of a DSP. In a constitution of the portion for performing an address control for an internal memory and an external memory of the DSP, among memory access addresses of 20 bits from A0 to A19 which are accessed by an address pointer, low order bits A0 and A1 are masked. In an address setting and an address computation performed on the program which executes each of the jobs of the DSP, only an address space of 18 bits from A2 to A19 other than the masked A0 and A1 can be accessed. For the masked two bits of A0 and A1, the address pointer shared by for each of the jobs is incremented (+1), whereby a memory area for each of the jobs is allocated for each increment.

In the above-described constitution, the memory areas of the jobs of $2^2$=four can be secured by signal outputs of the low order two bits. Thus, as shown in FIG. 6, all of the memory access addresses can be allocated to the areas of the jobs for each increment. In each area, an operand value and a coefficient data can be written to the memory address designated by the address pointer.

The adoption of the foregoing constitution to a DSP which adds sound effects such as the chorus effect and the delay effect to music sounds produced from an electronic music instrument was tried. In the constitution of a system in which these effects are processed as the jobs EFF1 to EFF4 in a time-shared fashion with one DSP, processings are performed according to the flow chart as shown in FIG. 7.

When the power is turned on, a sampling clock waiting state is brought about (S11). A signal Lch input for the left channel is obtained by fetching the signals given to IN1, IN2, IN3 and IN4 in FIG. 4 into the registers I1, I2, I3 and I4 as In1, In2, In3 and In4. A signal Lch outputting for the left channel are performed by outputting the signal data of Out1, Out2, Out3 and Out4 from temporary registers O1, O2, O3 and O4 to OUT1, OUT2, OUT3 and OUT4 in FIG. 4 (S12).

Next, it is decided whether the job EFF1 is effective or not, and it is checked whether the signal is to be processed by passing through the flow of the effect program for the job EFF1, that is, the processing for adding the effect is to be performed or whether the signal is allowed to bypass for dealing beforehand because of the change of the acoustic effect (S13).

When the job EFF1 is in an effectively normal state, the effective program (for example, the chorus effect) is called (S14). The call of this effective program is selected among a plurality of acoustic effect additional routines stored in a storing area of the instruction memory (I-RAM) by a program counter. The acoustic effect program to be selected in total must be contained in a predetermined storing area of the foregoing instruction memory. When the job EFF1 is invalid, before the signal is bypassed through the acoustic effect program, a waiting time is given by the step number equivalent to the job EFF1 (S15). Here, using the loop instruction provided, for example, in the DSP, looping is performed by the step numbers required, that is, the step number of the job EFF1 written to the coefficient RAM is loaded, and it is delayed by the number.

Next, the value of the pointer (DPTR) of the internal memory (D-RAM) and the value of the pointer (XPTR) of the external RAM (X-DRAM) are incremented (+1)(S16).

After processing of the acoustic effect additional routine its signal data is multiplied with the coefficient C1a, and the input In1 stored in the foregoing resister I1 is multiplied with the coefficient C1b. Then, both of the values of the multiplication results are added and the addition result is stored in the temporary register O1. At this time, by controlling the values of the foregoing coefficients C1a and C1b, the signal to which the acoustic effect is added and the signal to which no acoustic effect are allowed to be cross-faded (S17). Thus, the processing for changing the acoustic effect is completed.

Next, the memory area set by the foregoing increment is designated as an access area of the job EFF2. For the job EFF2, the same processing is hereinafter repeated. Moreover, for the jobs EFF3 and EFF4, access areas are designated, similarly, and the same processing is repeated.

The signal Rch input for the right channel is obtained by fetching the signals given to IN1, IN2, IN3 and IN4 in FIG. 4 into the registers I1, I2, I3 and I4 as In1, In2, In3 and In4. The signal Rch outputting for the right channel are performed by outputting the signal data of Out1, Out2, Out3 and Out4 from temporary registers O1, O2, O3 and O4 to OUT1, OUT2, OUT3 and OUT4 in FIG. 4 (S18). After completion of this processing, the flow returns to the initial sampling clock waiting state.

In the foregoing constitution, the masked portion of the lower order two bits can be allocated to the memory areas of each of the jobs for each increment by incrementing the address pointer shared by each of the jobs. Therefore, when one job is being executed, accesses to the memory areas of other jobs never occur. Even though the jobs in parallel processed have the same program content, an access to one memory area by the programs of the other jobs is prevented.

Since the DSP used in the foregoing two embodiments possesses the characteristic capable of performing computations for a plurality of independent programs within one sampling time in a time-shared fashion, the DSP can be utilized for electronic music sound producing systems capable of processing a plurality of acoustic effects such as an electronic music instrument, a Desk Top Music instrument and a Karaoke machine and time sharing processing systems such as a car-audio machine, an oscillation analyzer and an active noise filter.

Although the preferred embodiments of the present invention have been described in detail, it should be understood that various changes, substitutions and alternations can be made therein without departing from spirit and scope of the inventions as defined by the appended claims.

What is claimed is:

1. A method for controlling a memory address of a digital signal processor is characterized in that in a digital signal processor dealing with an address space of M bits as an address object and reading a job into a memory of said address space to execute said job, when jobs not more than $2^N$ are executed in a time-shared fashion, an address setting and an address computation performed on a program for executing each of the jobs are executed with respect to only address spaces of (M−N) bits and areas of the address spaces are made different for each job by setting remaining N bit addresses among said M bit addresses to different values.

2. The method for controlling a memory address of a digital signal processor according to claim 1, wherein the values corresponding to said N bits addresses are possible to set variable from the outside of the DSP.

3. The method for controlling a memory address of a digital signal processor according to claim 1, wherein said N bit addresses are on the most significant bits side among the M bit addresses.

4. A method for controlling a memory address of a digital signal processor which comprises an internal and/or external memory including address spaces of M bits is characterized in that when jobs not more than $2^N$ are executed in a time-shared fashion, an address setting and an address computation performed on a program for executing each of the jobs are executed with respect to only address spaces of (M−N) bits and the remaining N bit addresses among the M bit addresses are set by incrementing an address pointer shared to each job.

5. The method for controlling a memory address of a digital signal processor according to claim 4, wherein the values corresponding to said N bits addresses are possible to set variable from the outside of the DSP.

6. The method for controlling a memory address of a digital signal processor according to claim 4, wherein said N bit addresses are on the least significant bits side among the M bit addresses.

* * * * *